J. S. SPIREWFKI, Jr.
TILTABLE MOUNTING FOR AUTOMOBILE HEADLIGHTS.
APPLICATION FILED OCT. 23, 1916.
1,230,939.
Patented June 26, 1917.
3 SHEETS—SHEET 1.
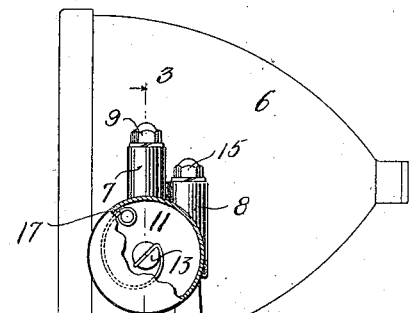
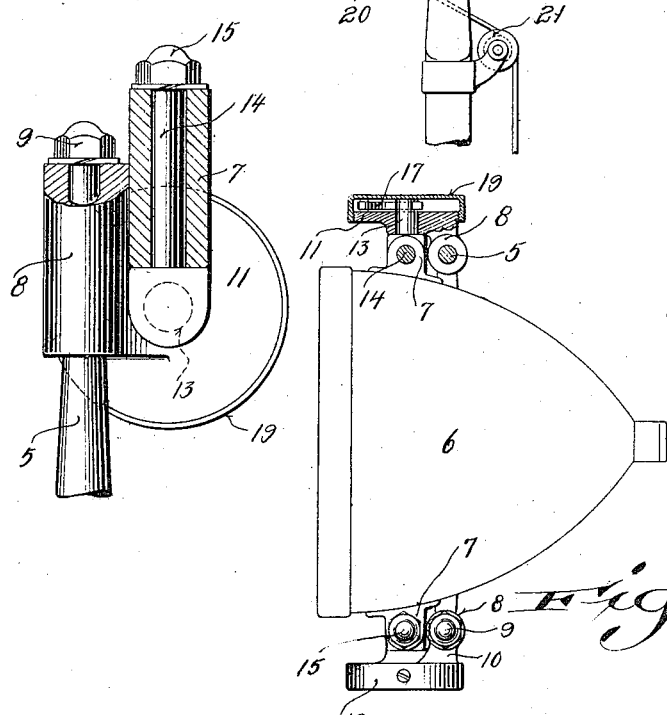
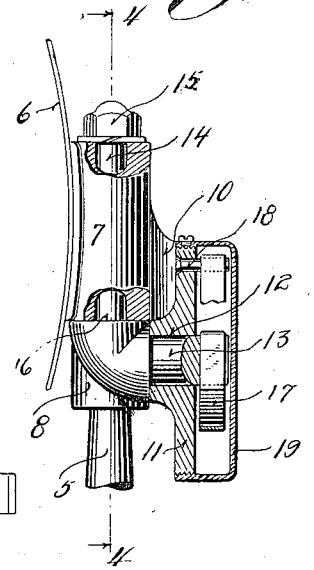
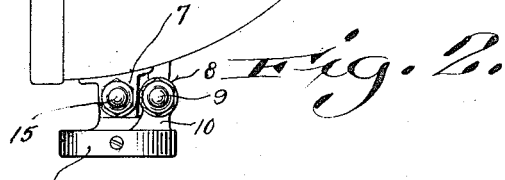

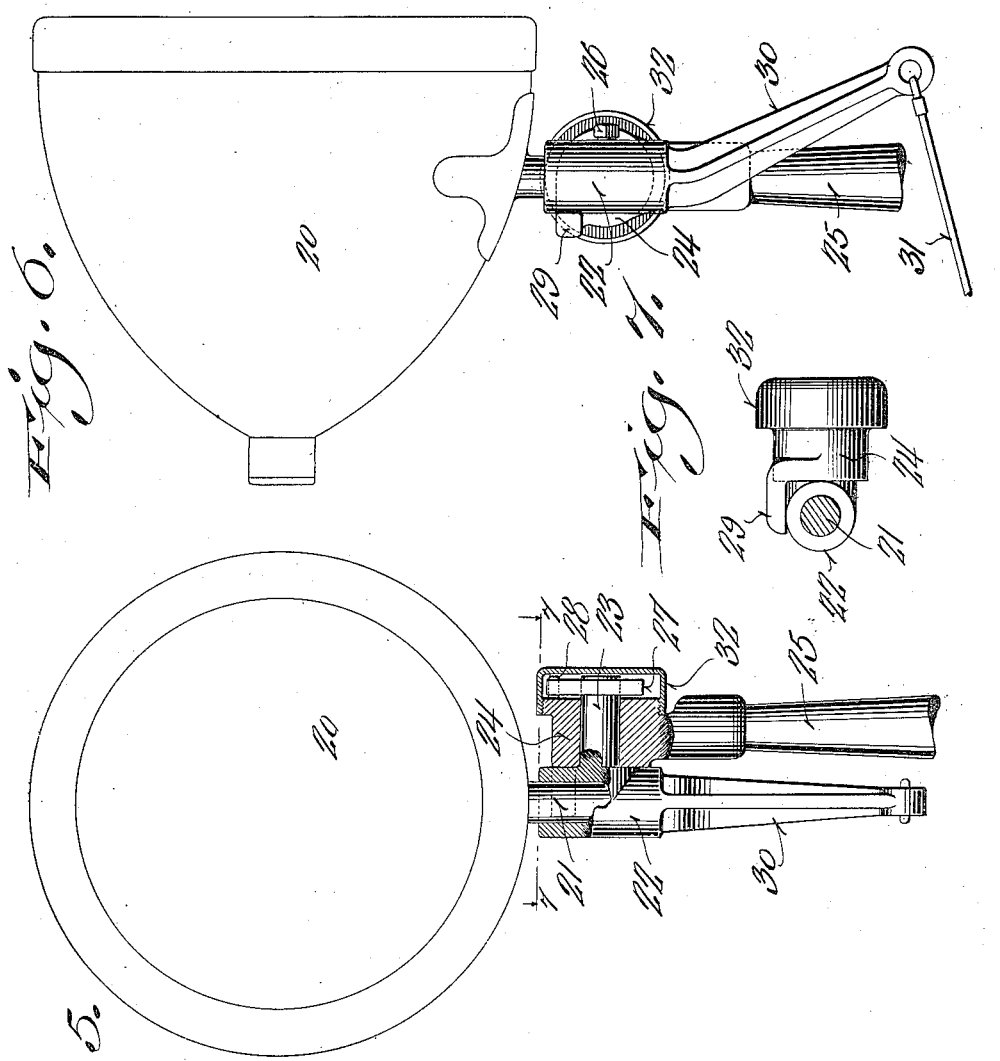

J. S. SPIREWFKI, Jr.
TILTABLE MOUNTING FOR AUTOMOBILE HEADLIGHTS.
APPLICATION FILED OCT. 23, 1916.
1,230,939.
Patented June 26, 1917.
3 SHEETS—SHEET 3.
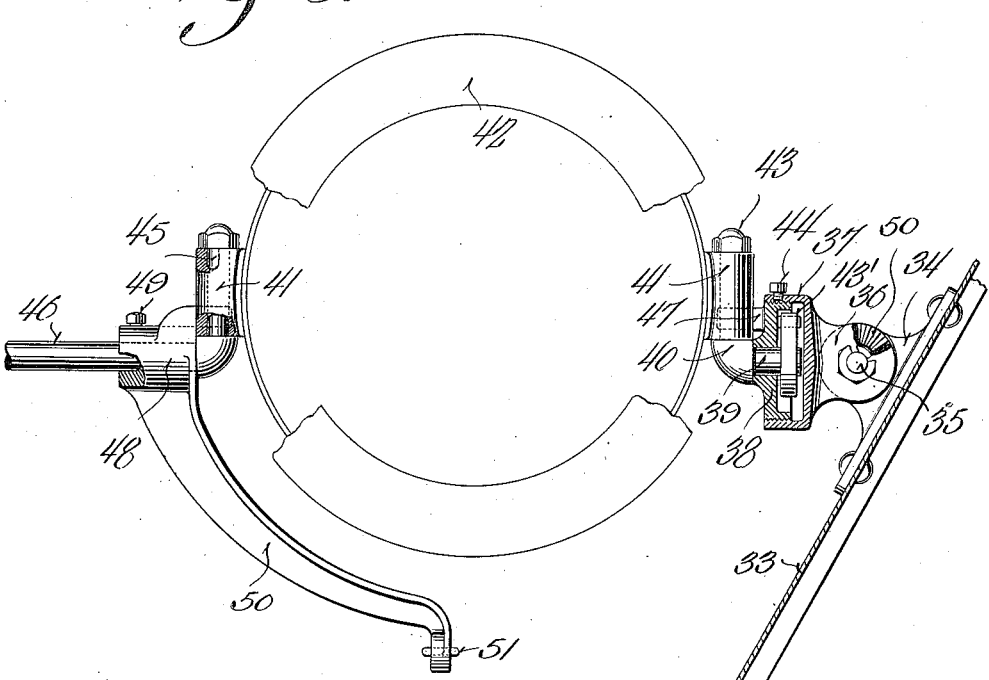
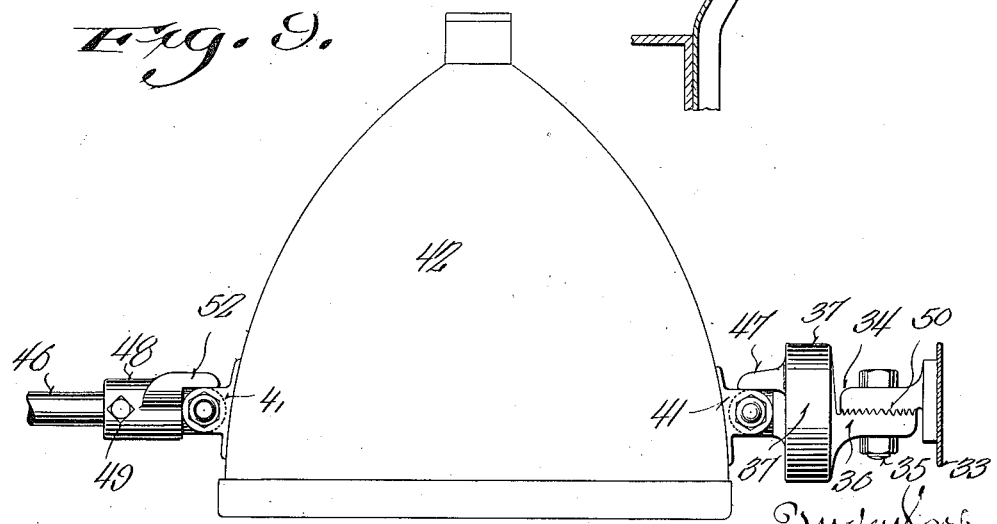

UNITED STATES PATENT OFFICE.

JOHN S. SPIREWFKI, JR., OF MILWAUKEE, WISCONSIN, ASSIGNOR OF ONE-THIRD TO DANIEL C. O'CONNELL AND ONE-THIRD TO JAMES E. O'CONNELL, BOTH OF MILWAUKEE, WISCONSIN.

TILTABLE MOUNTING FOR AUTOMOBILE-HEADLIGHTS.

1,230,939.     Specification of Letters Patent.     Patented June 26, 1917.

Application filed October 23, 1916. Serial No. 127,085.

*To all whom it may concern:*

Be it known that I, JOHN S. SPIREWFKI, Jr., a citizen of the United States, and resident of Milwaukee, in the county of Milwaukee and State of Wisconsin, have invented certain new and useful Improvements in Tiltable Mountings for Automobile-Headlights, and I do hereby declare that the following is a full, clear, and exact description thereof.

The present invention relates to new and useful improvements in means for mounting the head lights of automobiles in a manner whereby said head lights may be tilted to direct their rays downwardly onto the ground immediately in front of the automobile, to eliminate the objectionable and dangerous blinding effect produced by the headlights in their normal position upon persons in an oncoming automobile or other vehicle.

The object of the present invention is to provide an exceedingly simple and attractive mounting for the headlights of the automobile whereby they may be tilted vertically by suitable seat controlled means, and which includes spring means for normally holding the headlights in their usual horizontal position.

It is further an object to provide a tiltable mounting of this nature, which is adapted for association with various types of head light mountings now in common use, in a manner requiring no modifications, either of the lamp carried or automobile carried parts of said mounting.

With the above and other objects and advantages in view the invention resides more particularly in the novel combination, formation and arrangement of parts more particularly hereinafter described and particularly pointed out in the appended claims.

In the drawings:

Figure 1 is a side elevational view of an automobile headlight having the improved tiltable mounting associated therewith.

Fig. 2 is a top plan view of the headlight mounting, one of the brackets being broken away to more clearly disclose the parts thereof.

Fig. 3 is a vertical sectional view through one of the brackets taken transversely of the axis of movement of the lamp of the head light portion of the bracket, as indicated by the line 3—3 of Fig. 1.

Fig. 4 is a vertical sectional view through one of the brackets on a plane at right angles to the plane of Fig. 3 as indicated by the line 4—4 of Fig. 3.

Fig. 5 is a front elevational view of a tilting lamp support embodying another embodiment of my present invention, and comprising a structure adapted for use, with a single lamp supporting standard portions of the support being broken away to more clearly disclose the structure.

Fig. 6 is a side elevational view of the form of support shown in Fig. 5.

Fig. 7 is a transverse sectional view on the line 7—7 of Fig. 5.

Fig. 8 is a front elevational view of a tiltable support embodying still another form of my invention, this form being particularly adapted for use in attaching the lamp between the mud guards of an automobile and in coupled relation to the lamp at the other side of the automobile.

Fig. 9 is a top plan view of the support shown in Fig. 8.

Referring now more particularly to Figs. 1 to 4 inclusive of the accompanying drawings, 5 designates each of the upstanding standards of the usual headlight carrying member of an automobile, and 6 designates a headlight having a pair of vertical sleeves 7 at diametrically opposed portions thereof adapted to normally receive the upper ends of the standards 5 to secure the headlight thereto.

In the improved tiltable mounting shown in Figs. 1 to 4 both the said usual standards 5 and headlight carried sleeves 7 are utilized, and each of the tiltable mountings includes a sleeve 8 corresponding in shape to a headlight carried sleeve 7 whereby it may fit over one of the standards 5 and be held thereon in the usual manner by a nut 9 threaded on the extremity of the standard. Integrally connected to the sleeve 8 by a web portion 10 is a bearing head plate 11 extending in a plane parallel to the tilting movement of the headlight, and disposed outwardly and somewhat forwardly of the sleeve 8. This plate is provided with a central bearing 12 for a lateral trunnion 13 of a normally vertically extending tiltable bar 14 which is of substantially the same size as the upper end of a stationary standard 5 whereby to fit the lamp carried sleeve 7, being secured rigidly to the sleeve by a nut 15 threaded on this upper end by the provision of a shoulder 16 adjacent its lower end against which the bottom of the sleeve abuts.

The relative size of the sleeves 7 and 8 together with the pivotal mounting of the trunnion 13 is such that when the bars 14 are disposed vertically to hold the headlight in a horizontally projecting position the sleeves 7 and 8 abut throughout the adjacent portions of their lengths. For holding the headlight in this normal horizontal position the trunnion 13 is extended outwardly of the plate 11 and has secured thereto a spiral spring 17 which has its outer end secured to a pin 18 projecting from the plate. This spring and projecting end of the trunnion are housed by a cap casing 19 threaded on the periphery of the plate.

For tilting the headlight thus mounted, a cable 30 is secured to the forward end of the bottom of the headlight and is directed rearwardly and downwardly there-under about a pulley 21 carried by the usual headlight supporting means, this cable extending preferably to a point adjacent the driver's seat.

Inasmuch as the trunnion carrying bars 14 are carried rigidly by the headlight, undesired looseness of parts is prevented. Also it is noted that inasmuch as the sleeve 8 abuts the sleeve 7 in its normal vertical position the headlight is, at all times, held for proper horizontal projection when under control of the spring 17.

Referring now more particularly to the structure shown in Figs. 5 to 7 of the drawings, 20 designates in conventional outline a headlight carrying a single depending securing shank 21 engageable in a sleeve 22 which is provided with a laterally extending trunnion 23 journaled in a bearing head 24 carried by a standard 25 supported by a desired portion of the vehicle. The lamp shank is adapted to be locked in the sleeve 21 by a suitable set screw 26 threaded in said sleeve.

For normally urging the sleeve 21 to a vertical position whereby the lamp is carried to project its rays in a normal horizontal position, a spiral spring 27 has one end secured to the outer end of the trunnion 23 which is extended through the bearing head 24, and has its other end secured to a pin 28 projecting from the peripheral portion of the bearing head. The sleeve is held from tilting rearwardly past a vertical position by a transverse abutting arm 29 projecting from the upper portion of the bearing head 24. For tilting the sleeve to direct the rays of the lamp downwardly, a depending and preferably forwardly inclined arm 30 is carried by the sleeve and to the lower end of this arm is secured a cable 31 extending to a suitable position convenient for manipulation.

The bearing head 24 similarly to the bearing head 11 of the structure of Figs. 1 to 4 is circular, and to shield the spring 28 and projected trunnion end, a cap casing 32 is threaded on the head.

Referring now more particularly to the structure shown in Figs. 8 and 9, 33 designates a mud guard portion of an automobile which carries an apertured ear 34 through which is passed a securing bolt 35 which is passed also through an ear 36 carried by a cap member 37 into which threadedly engages a bearing head plate 38. Journaled in said head plate is a laterally extending trunnion 39 of a tiltably mounted standard 40 adapted to engage in the usual attaching sleeve 41 of a conventionally designated headlight 42 the sleeve being rigidly secured by a nut cap 43 threaded on the upper end of the standard and binding the sleeve against a shoulder at the lower portion of the standard similar to the shoulder 16 of the structure of Figs. 1 to 4.

The tiltable standard 40 is normally urged to vertical position by a spiral spring 43' secured to the projected end of the trunnion 39 and to the bearing head plate, in the present instance the spring being disposed partly in a counter-sunk portion of the outer face of the bearing head plate, and it is noted that in the present instance the cap 37 serves not only to shield the spring and projected end of the trunnion but serves also as a securing means of the headlight to the automobile being positively locked against rotation with respect to the bearing head plate 38 by a set screw 44.

At the inner side of the headlight the usual sleeve 41 is engaged by an upturned end 45 of a rod 46 which extends transversely of the automobile for attachment to the inner side of a similarly mounted lamp at the other side of the automobile, each of the lamps being held against tilting movement rearwardly past a vertical position by inwardly projecting arms 47 normally abutting the adjacent sleeve 41.

For tilting the head light structure just described a sleeve 48 is mounted on a connecting rod 46 adjacent one of the lamps, being held against slidable movement by a set screw 49 and this sleeve carries a depending arm 50 to the lower end of which is secured a cable 51 extending to a suitable position for convenient manipulation. The arm 50 is preferably curved inwardly with respect to its adjacent lamp whereby its lower end lies substantially below the center of the lamp. The sleeve 48 preferably carries an upwardly and rearwardly offset arm 52 abutting the adjacent headlight sleeve 41 whereby to relieve strain on the set screw 49 incidental to rocking the arm 50.

Inasmuch as the structure of Fig. 8 utilizes the usual sleeves 41 and the usual connecting rod 46 in mounting the lamp, the present invention may be associated with existing lamp support structures of this type, with but slight modification. The ears 34 and 36 are preferably provided on their adjacent faces with radial coacting teeth 53 whereby a slight degree of adjustment of the lamps may be permitted, and further whereby said ears are connected in a manner preventing possible looseness of parts.

What is claimed:

1. The combination with a lamp and a lamp standard, of a bearing plate having a bearing opening, a right angular member, one arm being secured to said lamp and the other forming a trunnion to be disposed in said bearing opening, the free end of said last mentioned arm extended beyond said plate, a spring secured to said trunnion and the bearing plate, a cap having its wall engaged with the periphery of said bearing plate, means for securing the wall of the cap and bearing plate together, said cap and plate thereby forming a housing for said spring, and means for tilting the lamp against the tension of said spring.

2. The combination with a lamp, and a lamp standard, of a circular bearing plate, the periphery of said plate being screw threaded, said plate also having a bearing opening, a right-angular member, one arm being secured to said lamp and the other forming a trunnion to be disposed in said bearing opening, the free end of the last mentioned arm being extended beyond said plate, a spring secured to said trunnion and the bearing plate, a circular cap, its annular wall being internally screw threaded for engagement with the screw threads on said bearing plate, said cap and bearing plate forming a housing for said spring, and means for tilting the lamp against the tension of said spring.

3. The combination with a lamp, and a lamp standard, of a sleeve secured to said lamp, a second vertical sleeve positioned on the end of said lamp standard, said sleeve forming a stop against which the first mentioned sleeve is adapted to abut, a circular bearing plate formed on the second mentioned sleeve and having a bearing opening, a rightangular bar having one end forming a trunnion and disposed in said bearing opening and the other end in the first named sleeve, said trunnion having its free end extending beyond the face of said bearing plate, a spring secured to the projecting end of said trunnion and to said bearing plate, a circular cap disposed over said spring and secured to said bearing plate, and means for tilting said lamp.

In testimony that I claim the foregoing I have hereunto set my hand at Milwaukee, in the county of Milwaukee and State of Wisconsin, in the presence of two witnesses.

JOHN S. SPIREWFKI, Jr.

Witnesses:
GEO. W. YOUNG,
M. E. DOWNEY.